United States Patent [19]

Chorkey

[11] 3,975,007
[45] Aug. 17, 1976

[54] RESILIENT MOUNTING STRUCTURE

[75] Inventor: William J. Chorkey, Farmington, Mich.

[73] Assignee: Ace Controls, Inc., Farmington, Mich.

[22] Filed: May 20, 1974

[21] Appl. No.: 471,566

[52] U.S. Cl. ............................. 267/152; 188/1 B; 248/24; 248/358 R; 267/63 A
[51] Int. Cl.² .......................................... F16F 3/08
[58] Field of Search ............ 188/1 B, 268; 267/141, 267/140, 152, 153, 63 R, 63 A, 137; 248/10, 22, 24, 358 R

[56] References Cited
UNITED STATES PATENTS

| | | | |
|---|---|---|---|
| 1,930,067 | 10/1933 | Tibbetts | 248/10 |
| 2,004,712 | 6/1935 | Thiry | 248/358 X |
| 2,074,340 | 3/1937 | Piron | 267/63 A X |
| 2,650,721 | 9/1953 | Bourdon | 213/45 |
| 2,942,872 | 6/1960 | Muller | 248/10 X |

FOREIGN PATENTS OR APPLICATIONS

| | | | |
|---|---|---|---|
| 116,999 | 5/1943 | Australia | 248/358 R |
| 1,272,049 | 7/1968 | Germany | 248/24 |
| 242,947 | 9/1969 | U.S.S.R. | 248/358 R |

*Primary Examiner*—George E. A. Halvosa
*Attorney, Agent, or Firm*—Robert G. Mentag

[57] ABSTRACT

A noise-preventing shock absorber adapted to suppress noise and absorb shock created by moving objects such as moving machine parts engaging mating surfaces and decelerating to zero velocity within a short stroke or travel distance. The shock absorber includes a unitary resilient member which is annularly shaped in plan view and provided with an axial opening, with the peripheral surface of the axial opening comprising an inner force-transmitting surface that is formed with a wavelike configuration in vertical cross section. An upper force-receiving shaft is disposed in the resilient member axial opening and has an exterior peripheral surface which is provided with a wavelike configuration in vertical cross section that mates with and is bonded to the wavelike inner force-transmitting surface of the resilient member. The resilient member is provided with a peripheral outer force-transmitting surface that is concentric with and axially offset downwardly from said inner force-transmitting surface, and which is provided with a wavelike configuration in vertical cross section. A lower force-receiving tube having an interior surface provided with a wavelike configuration in vertical cross section mates with and is bonded to the wavelike outer force-transmitting surface of the resilient member. The shock absorber member can be used in a stacked arrangement to provide shock-absorbing and noise-suppressing units of various capacities.

7 Claims, 7 Drawing Figures

RESILIENT MOUNTING STRUCTURE

SUMMARY OF THE INVENTION

This invention relates generally to noise-preventing apparatuses, and more particularly to a novel and improved noise-preventing shock absorber for supressing noises and absorbing shocks created by moving impact loads decelerated to zero velocity and impacting with a mating surface.

At the present time, industry is faced with the problem of meeting government imposed noise levels under which industrial manufacturing equipment must be operated. Accordingly, there is a current and increasing need for efficient apparatuses for absorbing and suppressing noise due to the operation of industrial manufacturing equipment. Many types of noise-suppressing and shock absorbing apparatuses have been devised heretofore for controlling noise pollution in industry. One type of prior art noise-suppressing and shock absorbing apparatuses is a shock absorber having an outer tube and an inner tube concentrically mounted therein by means of a bonded resilient member. Such prior art shock absorbers are constructed and arranged so that the desirable mode of operation for the inner tube is to have it moved longitudinally relative to the outer tube so that the resilient member goes into a state of tension, and with the inner tube moved to a position that may be termed beyond the "dead center". A disadvantage in such prior art shock absorbers is that they are subject to failure because they operate in a state of tension.

In view of the foregoing, it is an important object of the present invention to provide a novel and improved shock absorber for suppressing noise and absorbing shock, due to the operation of various types of industrial machinery, and which will reduce noise pollution in a manufacturing facility.

It is another object of the present invention to provide a novel and improved sound and noise-absorbing apparatus which is simple and compact in construction, economical to manufacture, efficient in operation, and which can be used as a single shock absorber or in a stacked or plural arrangement to provide shock and noise-suppressing units of various capacities.

It is still another object of the present invention to provide a novel and improved sound and noise absorbing apparatus which includes a unitary resilient member that is annularly shaped in plan view and provided with an axial opening, with the peripheral surface of the axial opening comprising an inner force-transmitting surface that is formed with a wavelike configuration in vertical cross section; an upper force-receiving shaft that is disposed in the resilient member axial opening and which has an exterior peripheral surface that is provided with a wavelike configuration in vertical cross section that mates with and is bonded to the wavelike inner force-transmitting surface of the resilient member; the resilient member is provided with a peripheral outer force-transmitting surface that is concentric with and axially offset downwardly from said inner force-transmitting surface, and which is provided with a wavelike configuration in vertical cross section; and a lower force-receiving tube having an interior surface provided with a wavelike configuration in vertical cross section and which mates with and is bonded to the wavelike outer force-transmitting surface of the resilient member.

Other objects, features and advantages of this invention will be apparent from the following detailed description, appended claims, and the accompanying drawings.

DESCRIPTION OF THE PREFERRED EMBODIMENTS

Figure 1:
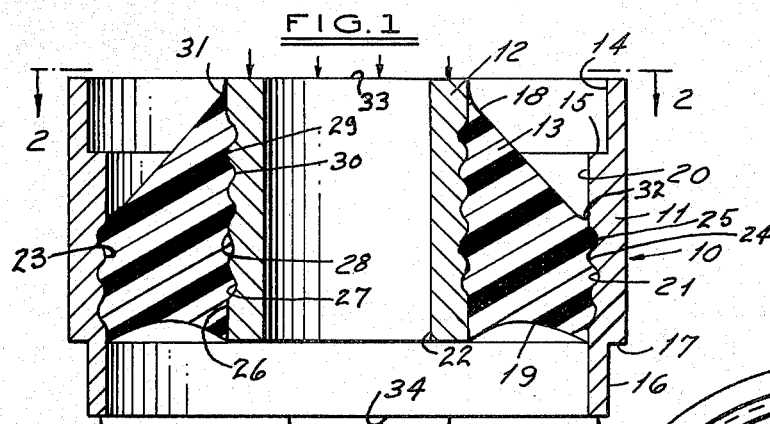
FIG. 1 is an elevational section view of a noise preventing shock absorber made in accordance with the principles of the present invention.
Figure 2:
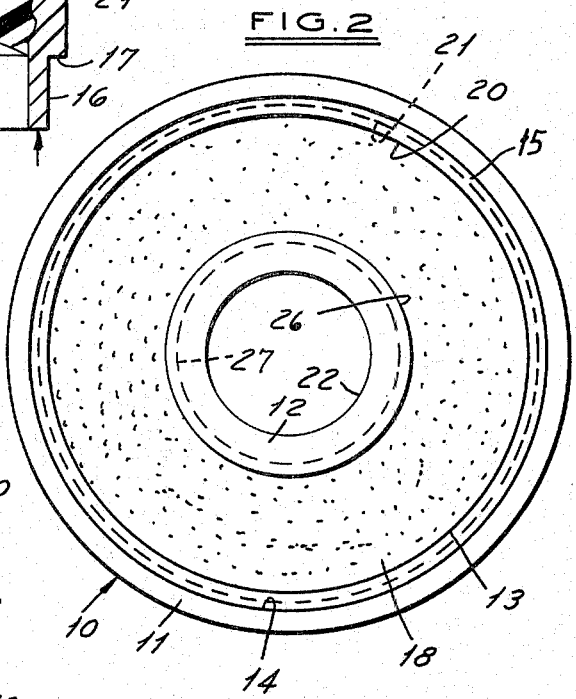
FIG. 2 is a top plan view of the shock absorber illustrated in FIG. 1, taken along the line 2—2 thereof, and looking in the direction of the arrows.

Referring now to the drawings, and in particular to FIGS. 1 and 2, the numeral 10 generally designates a noise preventing shock absorber member made in accordance with the principles of the present invention. The shock absorber member 10 is concentrically formed about its vertical center line. The shock absorber member 10 includes an annular, unitary resilient member 13 which is circular in plan form. The shock absorber member 10 further includes an outer sleeve or tube 11 and a concentric inner sleeve or tube 12. The outer and inner tubes 11 and 12, respectively, may be made from any suitable material which is bonded to the annular resilient member 13 by any suitable means. A typical adhesive is that described in U.S. Pat. No. 3,387,839.

The resilient member 13 may be made from any suitable resilient material, as for example, rubber, a rubber-like material, or any elastomeric material. A suitable synthetic elastomeric material is a urethane elastomeric material, and it is available on the market under the registered trademark "CYANAPRENE".

As shown in FIG. 1, the outer tube 11 is provided with a cylindrical bore 20, in the surface of which is formed a plurality of spaced annular grooves 21 which are longitudinally aligned. The annular grooves 21 are shown in FIG. 1 as being concave in vertical cross sectional shape, and they do not connect with the adjacent grooves, as in a screw thread, but they are individually formed around the entire periphery of the bore 20. The grooves 21 are longitudinally spaced by annular convex projections or protrusions 23 which have their outermost extended point in alignment with the surface of bore 20 from which they are formed. The grooves 21 are parallel with each other. The projections 23 are parallel with each other.

The outer periphery of the resilient member 13 is provided with inwardly extended, concave shaped annular grooves 24 which are longitudinally spaced apart, parallel with each other, and longitudinally aligned with each other. The peripheral grooves 24 are separately formed from each other, and they are spaced apart by parallel outward projections or protrusions 25.

As seen in FIG. 1, the projections 25 on the resilient member 13 mate with and are seated in the grooves 21 formed in the surface of the outer tube bore 20. The projections 23 formed in the surface of the outer tube bore 20 are adapted to mate with and be seated in the grooves 24 formed around the periphery of the resilient member 13. It is seen that the undulating outer peripheral surface of the resilient member 13 forms an outer force-transmitting surface which is bonded to the undulating portion of the surface of the outer tube bore 20 which functions as a lower force-receiving tube.

As shown in FIG. 1, the inner tube 12 functions as an upper force-receiving tube and it is provided with a longitudinal cylindrical bore 22 which is concentric with the outer tube bore 20. The inner tube 12 is also provided with an outer cylindrical periphery or surface 26 which is concentric with the inner bore 22.

As illustrated in FIGS. 1 and 2, a plurality of longitudinally spaced apart annular grooves 27 are formed in the surface of the inner tube periphery 26. The annular grooves 27 are shown in FIG. 1 as being concave in cross sectional shape, and they are parallel and do not connect with the adjacent grooves 27, as in a screw thread, but they are formed around the entire periphery 26 of the inner tube 12. The grooves 27 would be similarly shaped and of a size equal to the cross sectional shape of the grooves 21 formed in the outer tube bore 20, and equal to the grooves 24 formed in the outer periphery of the resilient member 13. The peripheral grooves 27 are longitudinally spaced by annular convex projections or protrusions 28 which are parallel and have their outermost extended points in alignment with the surface of the inner tube periphery 26 from which they are formed.

The resilient member 13 has a longitudinal, axial opening therethrough which has an undulating longitudinally extended inner force-transmitting surface that is concentric with the resilient member outer undulating force-transmitting surface.

The undulating longitudinally extended inner force-transmitting surface of the resilient member 13 is provided with concave shaped annular grooves 29 which extend in said surface, and which are parallel and longitudinally spaced apart, and longitudinally aligned with each other. The peripheral grooves 29 are separately formed from each other, and they are spaced apart by parallel projections or protrusions 30. As shown in FIG. 1, the projections 30 on the resilient member 13 mate with, and they are seated in the grooves 27 formed in the outer peripheral surface 26 of the inner tube 12. The projections 28 formed in the outer peripheral surface 26 of the inner tube 12 are adapted to mate with and to be seated in the grooves 29 formed around the periphery of the central longitudinal opening through the resilient member 13. The undulating inner force-transmitting surface formed by the grooves and projections 29 and 30, respectively, in the surface of the central opening through the resilient member 13 is bonded to the undulating portion of the inner tube periphery 26.

The grooves 21 in the outer tube 11 are preferably made concentric with the projections 28 on the outer surface of the inner tube 12, so as to enhance the gripping or retention of the resilient member 13. However, it will be understood that said grooves 21 and projections 28 would not necessarily have to be coplanar but could be offset longitudinally relative to each other.

As shown in FIG. 1, each of the resilient members 13 is provided with an upper surface 18 which is conically shaped, radially outward from the upper end of the inner force-transmitting surface of the resilient member 13. The lower surface 19 of each of the resilient members 13 is shaped concave upwardly, radially outward from the inner force-transmitting surface of the resilient member 13. As shown in FIG. 1, the upper end of the resilient member upper surface 18 is preferably terminated in a radius 31, and the lower end of said surface 18 is terminated in a radius 32, so as to minimize the stress concentration at those points, and to strengthen the resilient member 13 at those two points.

Figure 3:
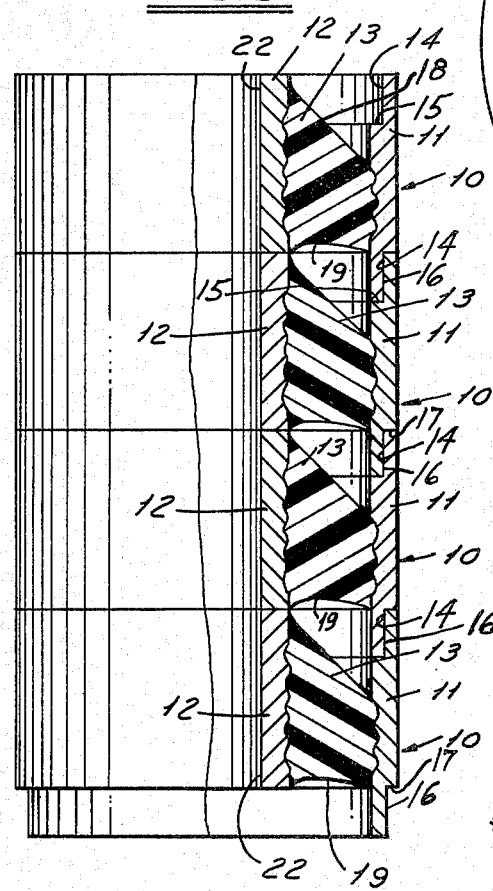
FIG. 3 is an elevational view, with a portion broken away and parts in section, of a plurality of the shock absorber members of FIG. 1 stacked vertically, one on top of another, and in a condition for absorbing a shock load during a compression stroke.

The shock absorber member 10 of the present invention may be used as a unitary member in the form shown in FIG. 1, or it may be used in a plural stacked arrangement, as shown in FIG. 3, wherein a plurality of the shock absorber members 10 are stacked in a vertical arrangement.

In order to use the shock absorber 10 of the present invention in a stacked arrangement, as shown in FIG. 3, the outer tube member 11 is provided at the upper and lower ends thereof with a predetermined shape for releasable mounting of a plurality of the shock absorber members 10 in a stacked arrangement. As shown in FIG. 1, the bore 20 in the outer tube 11 is enlarged at the upper end thereof as indicated by the numeral 14. The enlarged bore 14 extends inwardly to a shoulder 15 at the junction point with the bore 20. The lower end of the outer tube 11 is provided with a reduced outer diameter 16 which terminates at its shoulder 17. As shown in FIG. 3, the reduced diameter portions 16 are adapted to be slidably mounted in the enlarged bore portions 17, in the upper end of the next below shock absorber member 10. It will be understood that the reduced diameter lower end portions 16 may be threaded, and the upper enlarged bore portions 14 may be threaded for threadably joining the plurality of the shock absorber members 10 in a stacked arrangement, as shown in FIG. 3.

In use, the unitary embodiment of FIG. 1 is disposed in an operative position whereby an impact or shock load is received on the upper end 33 of the inner tube 12. The lower end 34 of the outer tube 11 rests on a supporting surface. The impact load may also be applied to the inner tube 12 at the lower end thereof, by threading the bore 22 of the inner tube 12 for threadable engagement with a force imparting member. An impact load is transmitted from the inner tube 12 through the inner force-transmitting surface of the resilient member 13 into the resilient member 13 which is put into compression and shear.

Figure 4:
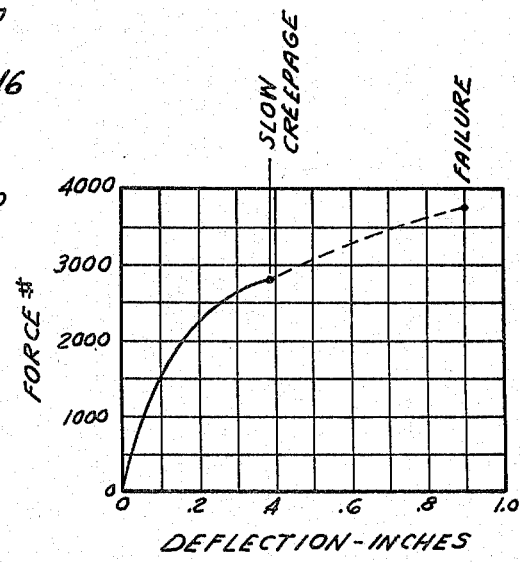
FIG. 4 is a graph illustrating the actual performance of a noise preventing shock absorber made in accordance with the principles of the present invention.

As shown in the enclosed graph of FIG. 4, the deflection of the resilient member 13 is plotted against the force applied to the resilient member 13. The resultant curve is relatively linear for a substantial distance through the useable stroke, after which the resilient member 13 comes under tension and shear, as indicated between the points marked by the terms "slow creepage" and "failure". The shock absorber 10 of the present invention does not operate between the last two points. The prior art shock absorbers of the present type operate between the last two mentioned points so as to deflect the resilient member 13 longitudinally so that the material of the resilient member went into the tension state, wherein it had buckled or snapped downward to move the inner tube 12 downwardly, to pass what may be termed "a dead center", as for example, the shock absorbers shown in the W. J. Mordarski U.S. Pat. No. 2,719,017. The applicant's device does not operate in the last described manner of the prior art devices, and the varying cross section of the resilient member 13 mechanically resists the tendency to push the inner tube 12 past said "dead center" and through the outer tube 11, as called for in the operation of said last mentioned prior art shock absorbers. The point marked "slow creepage" indicates where, in actual performance, the bond would start to fail between the outer and inner members 11 and 12 respectively. The point marked "failure" does not indicate total coming apart of the resilient member 13 from the outer and inner tubes 11 and 12, respectively, but that the bond between these members had failed sufficiently to start a tearing of the bond.

Figures 5, 6, 7:
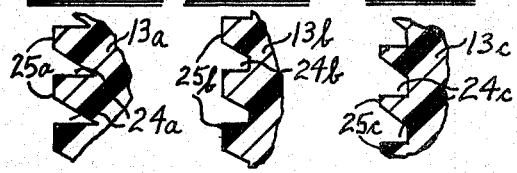
FIGS. 5, 6 and 7 illustrate additional types of annular protrusions and grooves that may be employed in shock absorbers made in accordance with the principles of the present invention.

FIGS. 5, 6 and 7 illustrate additional types of shaped projections that may be employed in the invention to provide the resilient member 13 with a varying cross section that will mechanically resist movement of the inner tube 12 through the outer tube 11. The grooves and projections employed in the embodiment of FIGS. 1 through 3 have curved or sinusoidal shapes so as to have an undulated configuration in vertical cross section. The vertical cross sections of the projections illustrated in FIGS. 5, 6 and 7 would provide what may be termed serrated configurations in vertical cross section. The aforementioned undulated and serrated configurations are broadly termed wavelike configurations. The serrated configuration could also be termed sawtoothed in configuration.

FIG. 5 is a fragmentary, elevational cross section view of the outer periphery of a modified resilient member 13a, wherein the numeral 25a indicates the projections and the numeral 24a indicates the grooves formed in the outer periphery of the resilient member 13a. The projections 25a each have an outer surface that is straight and parallel to the longitudinal axis of the shock absorber member 10. The outer surface of the projections 25a are in longitudinal alignment with each other. The grooves 24a are illustrated as being two-sided, with a lower side face being perpendicular to the outer face of the projections 25a, and the upper side face slanting inwardly and downwardly, so as to form a groove which is triangular in vertical cross section. It will be understood that the inner periphery of the resilient member 13a would be formed with a similar configuration.

FIG. 6 illustrates a second modified resilient member 13b which has straight faced projections 25b that are disposed in longitudinal alignment with each other and parallel to the longitudinal axis of the shock absorber member 10 with which the resilient member 13b would be used. The grooves 24b are three-sided, with an inner longitudinal face parallel to the longitudinal axis of the resilient member 13b, a lower end face perpendicular to the axis of the resilient member 13b, and an upper side face which slopes inwardly and downwardly relative to the longitudinal axis of the resilient member 13b. It will be understood, that the inner periphery of the resilient member 13b would be provided with a similar configuration.

FIG. 7 illustrates a third modified resilient member 13c wherein the projections are indicated by the numeral 25c and the grooves by the numeral 24c. The projections and grooves in this embodiment are substantially the same as in the embodiment of FIG. 6, but the length of the outer faces of the projections 25c are shorter than the length of the outer faces of the projections of 25b, due to the increased angularity of the upper side face of the grooves 24c. It will be understood that the inner periphery of the resilient member 13c would be provided with a similar configuration.

It will be understood that the term "upper force-receiving shaft" as used in the claims hereinafter includes the inner tube 12. The term "lower force-receiving tube" indicates the outer tube 11.

It will be understood that the shock absorber of the present invention may be made to any desired size. In one illustrative embodiment, the length of the outer tube 11 was 2¼ inches, and the length of the inner tube 12 was 1¾ inches. The depth of the counter bore 14 was ½ inch and the length of the reduced diameter portion 16 was ½ inch. The sloping upper end surface 18 of the resilient member 13 was formed at an angle of approximately 43° relative to the longitudinal axis of the shock absorber member 10. The lower concave end 19 of the resilient member 13 was formed with a ¾ inch radius.

In the free state, or without any load being impressed on the shock absorber 10, the shoulder 17 is in horizontal alignment with the lower end surface of the inner tube 12. The upper end surface of the outer tube 11 is also in horizontal alignment with the upper end 33 of the inner tube 12. It will be seen that in the stacked arrangement of FIG. 3, the shoulder 15 on a lowermost shock absorber 10 receives the lower end of the reduced diameter portion 16 of the next uppermost shock absorber 10, and the shoulder 17 of said next uppermost shock absorber 10 abuts the upper end of the first mentioned shock absorber 10. Also, the lower end of the uppermost inner tube 12 abuts the upper end of the next below inner tube 12, and so on down the stack of shock absorbers 10. It will be seen that an impact load impressed on the upper inner tube 12 is thus distributed downwardly into each of the resilient members 13 to cushion the shock of the load and decrease noise.

While it will be apparent that the preferred embodiments of the invention herein disclosed are well calculated to fulfill the objects above stated, it will be appreciated that the invention is susceptible to modification, variation and change.

What is claimed is:
1. A shock absorber comprising:
   a. a resilient member which is annularly shaped in plan view and which is provided with an axial opening therethrough, with the peripheral surface of the axial opening forming an inner force-transmitting surface which is provided with annular, peripheral grooves that form a wavelike configuration in vertical cross section;
   b. an upper force-receiving shaft disposed in said axial opening and having an exterior peripheral surface which is provided with annular, peripheral grooves that form a wavelike configuration in vertical cross section and which mates with and receives the wavelike inner force-transmitting surface of said resilient member and which is bonded thereto;
   c. said resilient member being provided with a peripheral outer force-transmitting surface concentric with said inner force-transmitting surface and which is provided with annular, peripheral grooves that form a wavelike configuration in vertical cross section, and wherein the upper-most portion of the inner force-transmitting surface is axially displaced relative to the outer force-transmitting surface;
d. a lower force receiving outer tube having an interior surface provided with annular, peripheral grooves that form a wavelike configuration in vertical cross section which mates with and receives the wavelike outer force-transmitting surface of said resilient member and which is bonded thereto;
e. said resilient member is provided with an upper surface which is conically shaped, radially outward from the upper end of the inner force-transmitting surface; and,
f. said resilient member is provided with a lower surface which is shaped concave upwardly, radially outward from said inner force-transmitting surface.

2. A shock absorber as defined in claim 1 wherein:
a. said upper force-receiving shaft comprises an inner tube.

3. A shock absorber as defined in claim 1 wherein:
a. the wavelike configuration of said force-receiving surfaces on said resilient member, and the wavelike configurations on the exterior surface of the upper force-receiving shaft and the interior surface of the lower force-receiving tube are formed by a plurality of transversely disposed, longitudinally spaced apart alternate parallel projections and grooves.

4. A shock absorber as defined in claim 3 wherein:
a. said grooves on said resilient member are longitudinally aligned;
b. the grooves on said upper force-receiving shaft are longitudinally aligned;
c. said grooves on said lower force-receiving tube are longitudinally aligned; and,
d. said grooves on said resilient member, upper force-receiving shaft and lower force-receiving tube are concentrically disposed.

5. A shock absorber as defined in claim 4, wherein said wavelike configuration comprises an undulated configuration.

6. A shock absorber as defined in claim 4, wherein:
a. said wavelike configuration comprises a serrated configuration.

7. A shock absorber having a plurality of shock absorbers and wherein each of said shock absorbers includes:
a. a resilient member which is annularly shaped in plan view and which is provided with an axial opening therethrough, with the peripheral surface of the axial opening forming an inner force-transmitting surface which is provided with a wavelike configuration in vertical cross section;
b. an upper force-receiving shaft disposed in said axial opening and having an exterior peripheral surface which is provided with a wavelike configuration in vertical cross section and which mates with and receives the wavelike inner force-transmitting surface of said resilient member and which is bonded thereto;
c. said resilient member being provided with a peripheral outer force-transmitting surface concentric with said inner force-transmitting surface and which is provided with a wavelike configuration in vertical cross section, and wherein the upper-most portion of the inner force-transmitting surface is axially displaced relative to the outer force-transmitting surface;
d. a lower force-receiving outer tube having an interior surface provided with a wavelike configuration in vertical cross section which mates with and receives the wavelike outer force-transmitting surface of said resilient member and which is bonded thereto;
e. the wavelike configurations of said force-receiving surfaces on said resilient member, and the wavelike configurations on the exterior surface of the upper force-receiving shaft and the interior surface of the lower force-receiving outer tube being formed by a plurality of transversely disposed, longitudinally spaced apart alternate parallel projections and grooves;
f. said grooves on said resilient member being longitudinally aligned;
g. the grooves on said upper force-receiving shaft being longitudinally aligned;
h. said grooves on said lower force-receiving tube being longitudinally aligned;
i. said grooves on said resilient member, upper force-receiving shaft and lower force-receiving tube being concentrically disposed; and,
j. said plurality of shock absorbers being disposed in a vertically stacked arrangement with the outer tubes thereof being operatively connected together, and with the lower end of the upper force-receiving shaft of a shock absorber being operatively seated on the upper end of the upper force-receiving shaft of the next below disposed shock absorber.

* * * * *